US009573810B2

(12) United States Patent
Berry et al.

(10) Patent No.: US 9,573,810 B2
(45) Date of Patent: Feb. 21, 2017

(54) PROCESSES FOR THE REMOVAL AND RECOVERY OF MINOR ELEMENTS IN WET-PROCESS PHOSPHORIC ACID

(71) Applicant: K-TECHNOLOGIES, INC., Lakeland, FL (US)

(72) Inventors: William W. Berry, Lakeland, FL (US); Thomas E. Baroody, Lakeland, FL (US)

(73) Assignee: K-TECHNOLOGIES, INC., Lakeland, FL (US)

( * ) Notice: Subject to any disclaimer, the term of this patent is extended or adjusted under 35 U.S.C. 154(b) by 0 days.

(21) Appl. No.: 14/416,264

(22) PCT Filed: Jul. 21, 2013

(86) PCT No.: PCT/US2013/051415
§ 371 (c)(1),
(2) Date: Jan. 21, 2015

(87) PCT Pub. No.: WO2014/018420
PCT Pub. Date: Jan. 30, 2014

(65) Prior Publication Data
US 2015/0166343 A1  Jun. 18, 2015

Related U.S. Application Data

(60) Provisional application No. 61/674,299, filed on Jul. 21, 2012.

(51) Int. Cl.
C01B 25/00 (2006.01)
C01B 25/238 (2006.01)
(Continued)

(52) U.S. Cl.
CPC .......... *C01B 25/238* (2013.01); *B01D 15/203* (2013.01); *B01D 15/362* (2013.01); *B01J 39/043* (2013.01);
(Continued)

(58) Field of Classification Search
None
See application file for complete search history.

(56) References Cited

U.S. PATENT DOCUMENTS 3,457,061 A * 7/1969 Kealy ................. C01B 25/2346
71/37
5,605,563 A * 2/1997 Kidby ...................... C22B 3/44
210/684
(Continued)

FOREIGN PATENT DOCUMENTS

JP   8-48507    *  2/1996
JP   08048507 A    2/1996
(Continued)

OTHER PUBLICATIONS

Bécamel, Philippe, International Preliminary Report on Patentability, Jan. 27, 2015.
(Continued)

*Primary Examiner* — Chester Barry
(74) *Attorney, Agent, or Firm* — Greer, Burns & Crain, Ltd.; Gregory P. Einhorn

(57) ABSTRACT

In alternative embodiments, the invention provides processes and methods for the recovery or the removal of the so-called "Minor Elements" consisting of iron, aluminum and magnesium (expressed as oxides), from wet-process phosphoric acid using a continuous ion exchange approach. In alternative embodiments, use of processes and methods of the invention allows for the reduction of these Minor Elements with minimal phosphate losses and dilution in order
(Continued)

to produce a phosphoric acid that is suitable for the production of fertilizer products such as world-class diammonium phosphate (DAP), merchant-grade phosphoric acid, super-phosphoric acid, and other phosphoric acid products. Further, use of the invention would allow the use of lower grade phosphate rock or ore, which would greatly expand the potential phosphate rock reserve base for phosphate mining activities, and allow for better overall utilization of resources from a given developed mine site.

28 Claims, 1 Drawing Sheet

(51) Int. Cl.

| | | |
|---|---|---|
| C01B 17/96 | (2006.01) | |
| C01F 11/46 | (2006.01) | |
| B01J 39/04 | (2006.01) | |
| B01J 39/14 | (2006.01) | |
| B01J 49/00 | (2006.01) | |
| B01D 15/20 | (2006.01) | |
| B01D 15/36 | (2006.01) | |

(52) U.S. Cl.
CPC ............. *B01J 39/14* (2013.01); *B01J 49/0069* (2013.01); *C01B 17/96* (2013.01); *C01F 11/46* (2013.01)

(56) References Cited

U.S. PATENT DOCUMENTS

| | | | | |
|---|---|---|---|---|
| 5,833,861 | A * | 11/1998 | Afeyan | ................ B01D 15/345 210/198.2 |
| 6,838,504 | B1 * | 1/2005 | Webster | ................... A62D 3/33 429/49 |
| 7,655,199 | B2 * | 2/2010 | Cable | ........................ C22B 3/08 423/11 |
| 2010/0068113 | A1 * | 3/2010 | Cohen | .................... B01J 41/046 423/302 |
| 2013/0089378 | A1 * | 4/2013 | Theodore | .................. C22B 3/06 405/128.5 |
| 2014/0081000 | A1 * | 3/2014 | Neumann | ........ A61K 39/39591 530/387.1 |
| 2014/0263073 | A1 * | 9/2014 | Barker | ...................... C02F 1/42 210/668 |

FOREIGN PATENT DOCUMENTS

| | | | |
|---|---|---|---|
| SU | 387723 | A1 | 6/1973 |
| SU | 387723 | * | 12/1973 |
| SU | 528260 | A1 | 9/1976 |
| SU | 602472 | * | 4/1978 |
| SU | 602472 | A1 | 4/1978 |
| WO | 9325472 | A1 | 12/1993 |

OTHER PUBLICATIONS

Tuzhilikina, E., Written Opinion of the International Searching Authority, Nov. 28, 2013.
Tuzhilikina, E., International Search Report, Nov. 28, 2013.

* cited by examiner

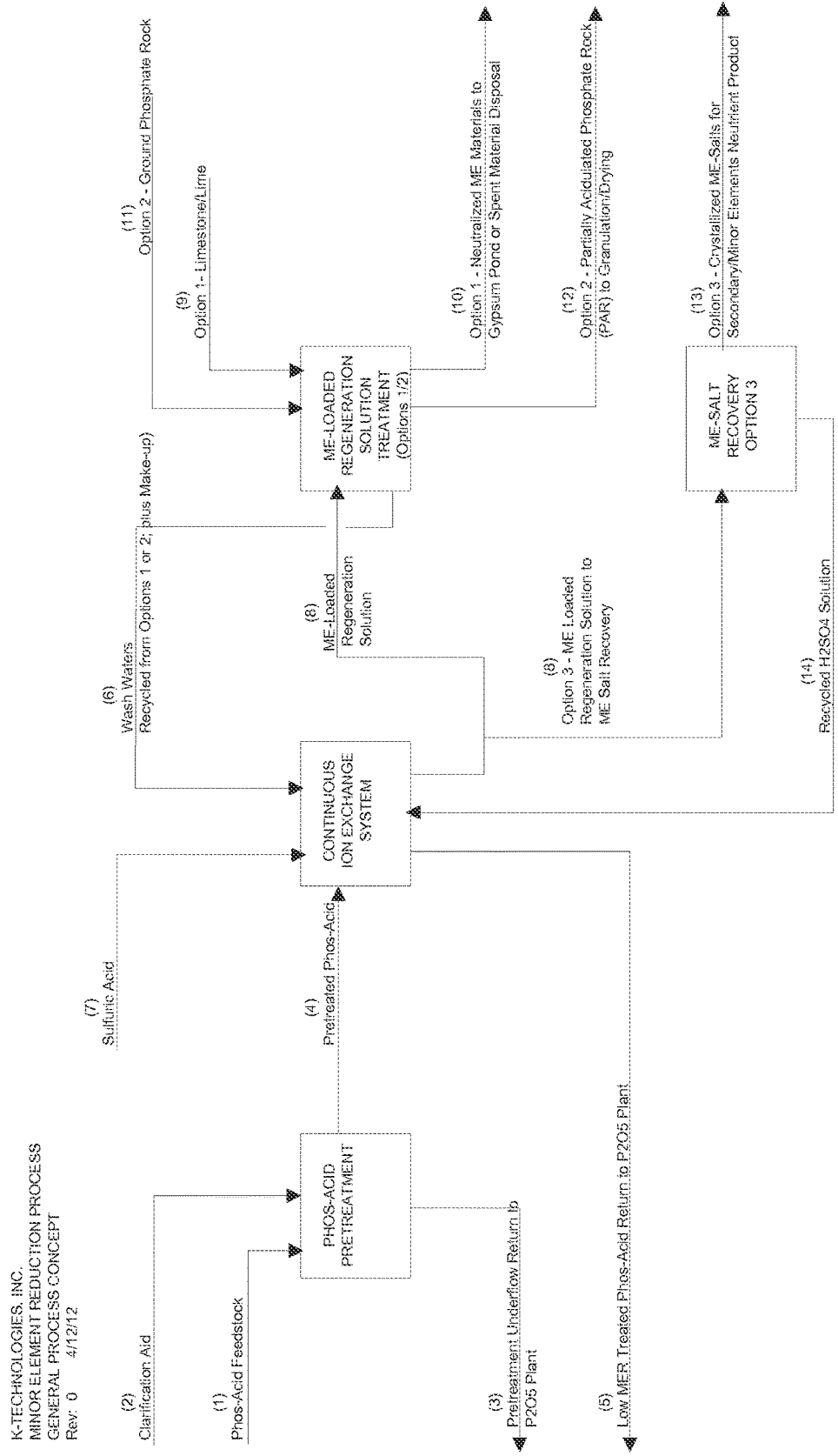

PROCESSES FOR THE REMOVAL AND RECOVERY OF MINOR ELEMENTS IN WET-PROCESS PHOSPHORIC ACID

RELATED APPLICATIONS

This application is a national phase application claiming benefit of priority under 35 U.S.C. §371 to Patent Convention Treaty (PCT) International Application Serial No: PCT/US2013/051415, filed Jul. 21, 2013, which claims benefit of priority to U.S. Provisional Patent Application Serial No. ("USSN") 61/674,299, filed Jul. 21, 2012. The aforementioned applications are expressly incorporated herein by reference in their entirety and for all purposes.

TECHNICAL FIELD

This invention generally relates to inorganic chemistry and environmental pollution control. In particular, in alternative embodiments, the invention provides processes and methods for the recovery or the removal of metals, e.g., the so-called "Minor Elements" consisting of iron, aluminum and magnesium (expressed as oxides), from wet-process phosphoric acid using a continuous ion exchange approach. In alternative embodiments, processes and methods of the invention are used with a wet-process acid that is high in metal contaminants, e.g., the so-called "minor elements (ME)". In alternative embodiments, use of processes and methods of the invention allows for the reduction of metal contaminants with minimal phosphate losses and dilution in order to produce a phosphoric acid that is suitable for the production of fertilizers and phosphoric acid products such as world-class diammonium phosphate fertilizer (DAP), merchant-grade phosphoric acid, superphosphoric acid, and other phosphoric acid products.

BACKGROUND

Phosphoric acid is a primary ingredient for the production of various phosphate products, including diammonium phosphate fertilizer (DAP); merchant-grade phosphoric acid (MGA); superphosphoric acid (SPA), and other various fertilizer and industrial-grade products. The phosphoric acid is made from the reaction of mined phosphate rock with sulfuric acid ($H_2SO_4$), for the most part, to produce a phosphoric acid solution and a by-product gypsum material. Phosphoric acid can also be produced via the reaction of phosphate rock with other acids such as hydrochloric acid and nitric acid, but the majority of the production is with sulfuric acid.

Since the phosphate rock is a mined material, it generally contains a number of associated impurities. Typically the rock can contain levels of iron, aluminum, magnesium (the so-called "minor elements"), as well as limestone, excess silica, traces of uranium and rare earths, and appreciable levels of fluoride components. To some extent, many of these impurities dissolve into phosphoric acid during the reaction of the phosphate rock with the acid source.

Phosphate rock itself is quite variable depending on its source. Some rocks are quite low in associated impurities and in general do not required any extra levels of beneficiation to produce the desired end-products. Other rock sources can contain relatively high levels of impurities and in many cases these impurities can make it difficult, if not impossible, to produce specification products.

Further as various rock sources are mined the typical trend is to mine the highest quality material first, and then over time mine the lower grade ore. In some cases, even though there is phosphate rock still available at a mine, the contained impurities are too high, and the rock cannot be chemically processed using the conventional technologies, thus the low-grade ore becomes essentially valueless. This, in turn, results in less than full recovery of the potentially useable phosphate ore.

Since the presence of impurities, especially the so-called "minor elements", can be detrimental to the phos-acid producer's ability to produce specification products, as well as diminish the potential phosphate rock that can be recovered from a given mine site, it would be desirable to have a method that can be used to reduce the dissolved impurities that are extracted into the acid and remove these impurities in such a manner that associated phosphoric acid losses are minimized and any phosphoric acid dilution is also held to a minimum. This would result in a significant increase in the quality of acid that could be produced by the phosphoric acid operation even with lower grade phosphate rock sources. Further, this would also greatly expand the potential phosphate rock reserve base for the phosphate mining operations and allow for better overall utilization of resources from a given developed mine site.

SUMMARY

The invention provides processes and methods for the recovery or the removal of metals, including the so-called "Minor Elements" consisting of iron, aluminum and magnesium, or their respective oxides, from a wet-process phosphoric acid using a continuous ion exchange approach. In alternative embodiments, processes and methods of the invention are used with a wet-process acid that is high in metal contaminants, e.g., iron, aluminum and magnesium, or their respective oxides—the so-called "minor elements (ME)". In alternative embodiments, use of processes and methods of the invention allows for the reduction of metal contaminants, e.g., iron, aluminum and magnesium, or their respective oxides, with minimal phosphate losses and dilution in order to produce a phosphoric acid that is suitable for the production of fertilizers and phosphoric acid products such as world-class diammonium phosphate fertilizer (DAP), merchant-grade phosphoric acid, superphosphoric acid, and other phosphoric acid products.

In alternative embodiments, processes and methods of the invention are used to reduce the dissolved impurities that are extracted into the acid and remove these impurities in such a manner that associated phosphoric acid losses are minimized and any phosphoric acid dilution is also held to a minimum. This results in a significant increase in the quality of acid that can be produced by a phosphoric acid operation, particularly including use with lower grade phosphate rock sources.

In alternative embodiments, processes and methods of the invention allow for phosphate rock mining operations to increase the recovery of potentially useable rock from a given site by allowing for the processing of lower grade ore sources. This further enables the effective "expansion" of a phosphate rock resource without the need for development of additional mining area, by allowing the producer to stay on a developed site and utilize lower grade materials. Further this also allows for the development of lower grade mine sources that heretofore have been considered unusable. In many countries, practicing the processes and methods of the invention allow for enhanced phosphate rock production capabilities, and allow for continued phosphoric acid operations with lower grade domestic or regional ore, e.g., the case in Florida where the ore quality has steadily been declining over the decades.

In alternative embodiments, processes and methods of the invention allow for the removal of various impurities via the application of a continuous ion exchange approach. The impurities are removed from the phosphoric acid, via extraction onto a specific ion exchange resin. After loading, the resin is then subjected to various washing steps and subsequently contacted with an acid solution, e.g., a sulfuric acid solution where the impurities are removed from the resin and recovered as an impurity-sulfate solution. This solution can be disposed of, or depending on the composition may be suitable for further processing to recover a useable ME-superphosphate material or a useable ME-sulfate product, e.g. magnesium sulfate. Other acids can be used for regeneration of the resin, e.g. nitric acid or hydrochloric acid, but these would be limited to sites where these acids are used for the production of phosphoric acid. Most wet-process facilities use sulfuric acid, and these represent the vast majority of the sites where this exemplary technology could be practiced.

In alternative embodiments, the regenerated resin is then washed and returned to extraction service for additional impurity removal from the phosphoric acid. The continuous ion exchange approach allows for this process to be carried out effectively and in an economically attractive manner.

In alternative embodiments, the invention provides methods or processes++ for the removal of one or more minor element (ME) components, or a mixture of minor element components, or an impurity or a contaminant, from a wet-process phosphoric acid comprising use of a continuous ion exchange system, comprising:

(a) providing a phosphoric acid solution, or a solution comprising a phosphoric acid, or a phos-acid feedstock, comprising one or more minor element (ME) components, or a mixture of minor element components;

(b) providing a strong cationic exchange resin or equivalent material or composition capable of binding the minor element (ME) components, wherein the strong cationic resin is in the H+ form, and optionally the strong cationic exchange resins or equivalent materials or compositions capable of binding the minor element (ME) components comprise:

a PUROLITE SST-60™ material, comprised of gel polystyrene crosslinked with divinylbenzene (DVB) and a sulfonic acid functional group (Purolite, Bala Cynwyd, Pa.), or equivalents;

a PUROLITE C100™ resin, comprised of gel polystyrene crosslinked with divinylbenzene (DVB) and a sulfonic acid functional group (Purolite, Bala Cynwyd, Pa.), or equivalents;

a DOWEX MSC 650™ material (Dow Chemical, Midland, Mich.), or equivalents;

a resin, a composition or a material, or a non-resin solid or a semi-solid material, comprising chelating groups, functionalities or moieties that can bind ME components, and optionally that comprise a sulfonic acid functional group, iminodiacetic groups, chelating aminomethyl phosphonic acid groups or aminophosphonic groups, or similar chelating functionalities or moieties, wherein optionally the compositions comprise beads, wires, meshes, nanobeads, nanotubes, nanowires or other nano-structures, or hydrogels;

(c) providing a regeneration solution comprising a strong acid, wherein optionally the strong acid comprises a sulfuric acid ($H_2SO_4$), a nitric acid (HNO3) or a hydrochloric acid (HCl), and optionally for the sulfuric acid the strength can be from about 5% to up to 98%, or can be in the range of about 20% to about 40%; and optionally with other acids the strength can vary from about 5% up to a concentrated level, or up to about 35%, 40%, 50%, 60%, 70%, 80%, 90% or 98%, or can be in the range of about 62% for nitric acid and about 37% for hydrochloric acid, or equivalent;

(d) applying the solution or phosphoric acid solution or phos-acid feedstock of (a) to the strong cation exchange resin under conditions such that the impurities, contaminants, or minor element (ME) components, remain on the cationic exchange resin, wherein optionally an effluent is produced that is substantially free of impurities, contaminants, or minor element (ME) components, and substantially most of the impurities, contaminants, or minor element (ME) components remain bound to the strong cation exchange resin, wherein optionally a phosphoric acid strength can range from about 12% to about 18% (e.g., as $P_2O_5$) (the so-called "recycle acid strength") to about 25% to about 30% $P_2O_5$ (a normal filter acid strength), and optionally higher strength acids can be used or processed with ranges from about 42% $P_2O_5$ up to about 54% $P_2O_5$; and optionally about 12% to about 18% $P_2O_5$ (a recycle acid strength) or about 25% to about 30% $P_2O_5$) (a filter acid strength); and (e) removing the impurities, contaminants, or minor element (ME) components, or eluting the impurities, contaminants, or minor element (ME) components, from the strong cation resin using the "regeneration" solution, resulting in (or thereby producing) a solution of the acid, or the sulfuric acid ($H_2SO_4$), or equivalent, containing or comprising the impurities, contaminants, or minor element (ME) components as an eluate.

In alternative embodiments, the minor element components, or impurities or contaminants, comprise a cationic form of the minor element (ME) materials, or can comprise an iron (optionally as a $Fe^{+2}$ or $Fe^{+3}$), or an aluminum (optionally in the $Al+^3$ form), or a magnesium (optionally as $Mg^{+2}$), and optionally a cationic calcium ($Ca^{+2}$) is also removed from the acid phase onto the resin.

In alternative embodiments, the phosphoric acid solution, solution comprising a phosphoric acid, or phos-acid feedstock, is first treated, or pre-treated, with a clarification process or a filtering process, or a clarification aid, wherein optionally the clarification process, filtering process or clarification aid comprises an activated clay, an activated carbon, an activated silica, or equivalents, or any combination thereof.

In alternative embodiments, the methods or processes of the invention further comprise treating the impurity-, contaminant- and minor element-containing effluent acid solution with a lime and/or a lime-limestone mixture to precipitate the contained (the eluted) minor elements as a hydroxide material; or, neutralizing the impurity-, contaminant- and minor element-containing effluent acid solution to precipitate the contained (the eluted) minor elements as a hydroxide material In alternative embodiments, the methods or processes of the invention further comprise separating the precipitated material for disposal. In alternative embodiments, the methods or processes of the invention further comprise recycling the treated water phase.

In alternative embodiments, the methods or processes of the invention further comprise treating the minor element-containing effluent acid solution with a mixture of ground phosphate rock, or equivalent. In alternative embodiments, the treated ground phosphate rock or equivalent is used to produce a phosphate fertilizer product, optionally comprising a fast release $P_2O_5$; a slow release $P_2O_5$; secondary nutrients; and/or minor element nutrients, optionally with subsequent recycling of the water of the acid phase back to the extraction system.

In alternative embodiments, the methods or processes of the invention further comprise evaporating the regeneration solution to selectively crystallize the minor element fractions, wherein optionally the crystallizing results in (or produces) an ME-sulfate salt, and optionally subsequently recovering the ME-sulfate salt, optionally as a marketable secondary/minor element fertilizer material, and optionally recycling the concentrated sulfuric acid ($H_2SO_4$) fraction to the primary extraction system.

In alternative embodiments, the strong cation resin is designed as a continuous ion exchange system operated to allow for the massive loading of one of the minor element components for recovery of a higher purity eluate, or product, wherein optionally the minor element component comprises a magnesium, and a higher purity magnesium sulfate product is recovered. In alternative embodiments, the strong cation resin is designed as a continuous ion exchange system operated by restricting the flow of the "regeneration" solution in order to preferentially load one of the minor element materials on the resin, or in the "regeneration" solution. In alternative embodiments, the strong cation resin is designed as a continuous ion exchange system having one or more of the zones, and the continuous ion exchange system is operated in an up-flow mode to allow for periodic resin bed expansion and flushing of any accumulated solids from the resin.

In alternative embodiments, the concentration of the strong acid, sulfuric acid, nitric acid or hydrochloric acid or equivalent in the "regeneration" solution is increased, optionally to concentrations in excess of about 40% for $H_2SO_4$; optionally in excess of about 50% for nitric acid or in excess of about 30% for hydrochloric acid, and optionally the method or process operates at an elevated temperature, optionally in excess of about 140 degrees F., but less than about 190 degrees F., and optionally between about 145 degrees F. and 160 degrees F., such that the resulting "spent", or effluent, regeneration solution containing or comprising the impurities, or the ME eluate, upon cooling, minor elements (MEs) sulfates crystallize from the solution as a mixed ME-sulfate product, thus allowing for or producing a concentrated acid, or sulfuric acid ($H_2SO_4$), for recycle.

In alternative embodiments, the invention provides industrial processes for the removal of one or more minor element components, or a mixture of minor element components, from a wet-process phosphoric acid comprising use of a continuous ion exchange system, comprising an industrial process as set forth in FIG. 1, or any portion or sub-process thereof.

The details of one or more embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference for all purposes.

BRIEF DESCRIPTION OF THE DRAWINGS

The drawings set forth herein are illustrative of embodiments of the invention and are not meant to limit the scope of the invention as encompassed by the claims. Figures are described and discussed herein.

FIG. 1 schematically illustrates an exemplary process of the invention, an overall process flow diagram for an exemplary impurity reduction process of the invention, referred to as "the Minor Element Reduction (MER) process". Also shown in FIG. 1 is two exemplary alternatives for the treatment of the regeneration solution from the continuation ion exchange (or "CIX") regeneration stage.

Like reference symbols in the various drawings indicate like elements.

Reference will now be made in detail to various exemplary embodiments of the invention, examples of which are illustrated in the accompanying drawings. The following detailed description is provided to give the reader a better understanding of certain details of aspects and embodiments of the invention, and should not be interpreted as a limitation on the scope of the invention.

DETAILED DESCRIPTION

In alternative embodiments, the invention provides processes and methods for the recovery or the removal of iron, aluminum and magnesium (as cationic species) the so-called "Minor Elements", from a wet-process phosphoric acid stream using a continuous ion exchange approach. In alternative embodiments, processes and methods of the invention allow for phosphate rock mining operations to increase the recovery of potentially useable ore or rock by allowing for the processing of lower grade ore or rock sources, thus enabling an effective "expansion" of the phosphate rock source without the need for development of additional mining area. Thus, the producer can stay on a developed site and utilize lower grade materials for a longer period of time.

In alternative embodiments, as illustrated in FIG. 1, the exemplary Minor Element Reduction (MER) reduction process of the invention comprises pretreating a phos-acid (e.g., by filtering), or receiving a pretreated phos-acid, e.g., a filtered phos-acid (a nominal 26% $P_2O_5$) (stream 1) from a main phos-acid plant, before its input into the continuous ion exchange system. The pretreatment can comprise, or the pretreatment can further comprise, the phos-acid being treated with a clarification aid (2) in order to reduce the suspended solids content in the acid stream. In alternative embodiments, this treatment can be modified according to specific needs, and results in the reduction of the suspended solids, along with some removal of the darker color to remove suspended solids from the acid phase, and to partially reduce longer-chain color body (organic) materials. The extent of pretreatment required is specific to each phosphoric acid source and will vary accordingly. In alternative embodiments, activated clay, e.g. calcium or sodium bentonite clays is suitable for this purpose.

In alternative embodiments, the underflow solids materials (3) recovered in this step can be filtered and disposed of to a gypsum pond, or alternatively returned to the phos-acid plant and combined with a filter feed slurry, e.g., a mixture of gypsum and phos-acid. In alternative embodiments, return of the solids to the phos-acid plant is preferred, if possible, in order to minimize $P_2O_5$ losses and dilution of the phos-acid.

In alternative embodiments, the pretreated acid (4) is then processed in a continuous ion exchange (CIX) system, where it is contacted with a specific ion exchange resin, or equivalent material capable of binding the ME components, in a continuous fashion. In general a "strong acid" cation exchange resin or equivalent material is used.

Examples of such resins or equivalent materials include, and optionally the strong cationic exchange resins or equivalent materials or compositions capable of binding the minor element (ME) components comprise:

- a PUROLITE SST-60™ material, comprised of gel polystyrene crosslinked with divinylbenzene (DVB) and a sulfonic acid functional group (Purolite, Bala Cynwyd, Pa.), or equivalents;
- a PUROLITE C-100™ resin, comprised of gel polystyrene crosslinked with divinylbenzene (DVB) and a sulfonic acid functional group (Purolite, Bala Cynwyd, Pa.), or equivalents;
- a DOWEX MSC 650™ material (Dow Chemical, Midland, Mich.), or equivalents;
- a resin, a composition or a material, or a non-resin solid or a semi-solid material, comprising chelating groups, functionalities or moieties that can bind ME components, and optionally that comprise a sulfonic acid functional group, iminodiacetic groups, chelating aminomethyl phosphoric acid groups or aminophosphonic groups, or similar chelating functionalities or moieties, wherein optionally the compositions comprise beads, wires, meshes, nanobeads, nanotubes, nanowires or other nano-structures, or hydrogels;

The primary requirement is that the resin or equivalent material be of the so-called "strong" cation form and be in the hydrogen (H+) form.

The minor element (ME) components, along with other cations, are removed from the acid and exchanged for an H+ ion that is on the resin, (which converts the ME-phosphate salt to phos-acid). In alternative embodiments, the treated acid (5) with lowered minor elements (ME) is then directed to a surge tank and returned to the phos-acid plant for normal downstream processing.

It is important to recognize that the ME-phosphate materials in the phos-acid are converted to the acid form. In this manner the $P_2O_5$ that would normally remain in the ME-phosphate form (which has little ammoniation potential) is now converted to an acid form which can be readily ammoniated.

The general exchange mechanism involved in the ME removal stage is as follows:

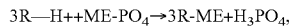

where R is the solid ion exchange resin: note that the "impurity" ME is converted to $H_3PO_4$ which is the desired form for phosphate (P) in the acid stream.

In alternative embodiments, the ion exchange resin, now loaded with the ME and other cationic materials, is then water washed (6) in a continuous fashion. In alternative embodiments, the water flows are controlled to minimize overall $P_2O_5$ dilution. The water can be obtained from recycled water originating in the spent regeneration solution treatment options (1 and 2). Make-up water can be provided via process water make-up from the phosphoric acid plant.

In alternative embodiments, the ME-loaded resin is then continuously regenerated with a solution of an acid, e.g., a sulfuric acid or an equivalent (7). In alternative embodiments, the $H_2SO_4$ strength is in the 10% to 30% range, depending on the ultimate disposition of the spent ME-sulfate stream. Other acids can be used, depending on the acids that are used for the digestion of the phosphate rock at the wet-process phos-acid facility. In the case of other acids, the ME in the spent regeneration solution will be in the salt form of the acid used for regeneration. For example, with nitric acid the ME's in the spent regeneration solution will be in the nitrate form, i.e. magnesium nitrate, iron nitrate, etc. In alternative embodiments, exemplary processes that have the most attractive applicability for the phosphate operations are those that use sulfuric acid for digestion, thus, at least for these exemplary processes, the ME's would more than likely be in the sulfate form.

In alternative embodiments the acid that removes the ME and other cationic materials from the resin is sulfuric acid, and to produce a ME/cationic-sulfate eluate solution, i.e. the so called "Spent Regeneration Solution" (SRS), the hydrogen component (H+) from the acid is loaded back onto the resin to allow for resin reuse. In alternative embodiments the regenerated resin is again washed with water, and then returned to ME/cation removal service as the cycle is repeated.

In alternative embodiments, an exemplary cationic exchange mechanism involved in the resin regeneration stage is as follows:

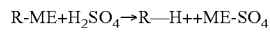

In alternative embodiments, equivalents to sulfuric acid ($H_2SO_4$) are used to "regenerate" the cationic exchange resin, i.e., to elute the "contaminants", metals and the like binding to the resin before elution with acid. Examples of these acids are nitric and hydrochloric.

The SRS (8) now contains the ME/cationic sulfate impurities along with residual free $H_2SO_4$. It is transferred to the ME-loaded regeneration solution treatment stage for further processing. The invention provides several exemplary options or alternatives for the treatment of this solution, depending on the specific characteristics of the solution and the location of the facility. In many cases it may be that the solution can be converted to a saleable product.

In the first exemplary option, Option 1, the regeneration solution is treated with a mixture of limestone and lime (9) and the ME-components are precipitated as insoluble salts (10). This solid material can then be removed from the aqueous phase, if desired, and the sludge disposed of to the existing gypsum stack system. The aqueous solution (10) resulting from the treatment step is reusable water and can be returned to the CIX system. This method allows for economic treatment of the solution and overall economic attractiveness for the MER process.

In the second exemplary option, Option 2, the loaded regeneration solution is mixed with ground phosphate rock (11), and the rock itself used as the treatment agent. After reaction, the rock material can be sold as a partially acidulated rock (12), or PAR product, and used as a modified superphosphate material. This product would be a low $P_2O_5$ analysis material that would have both fast release (water soluble) as well as a slower release (low water solubility) $P_2O_5$ fractions, and would also contain sulfate as well as the other minor elements, which in themselves are vital plant nutrients, for example, the so-called secondary and minor nutrients.

In alternative embodiments of the exemplary PAR Option 2, the regeneration of the resin is operated to produce a concentrated ME-sulfate solution, and the ME is eventually crystallized from the solution as ME slurry. The regenerated solution is heated to a level that is sufficiently high to allow for the minor element sulfates to stay in solution. The spent regeneration solution is cooled to allow for the crystallization of the ME-sulfate. The ME-sulfate would be removed and recovered, and the concentrated sulfuric acid returned to the continuous ion exchange system.

In an exemplary Option 3, if the amount of recovered ME is sufficient then there is the possibility of recovering specific marketable ME materials such as magnesium sulfate (MgSO$_4$) In some cases, these recovered ME-sulfates may have market value in their own right, thus the P$_2$O$_5$ "impurity" can be converted to a useable co-product.

In FIG. 1, the exemplary Option 3 alternative embodiment is shown for the case where a mixed ME-Sulfate product would be produced. The spent regeneration solution (8) would be sent to ME-Salt Recovery System and the solution concentrated to crystallize the ME-sulfate from the solution. In this case, the system would also be operated with a higher sulfuric acid solution, and at higher temperature in order to minimize the resulting water handling requirements. In alternative embodiments, the resulting crystallized ME-salt is dried then sold as a secondary/minor element product (13). The free sulfuric acid resulting from the crystallization (14) can be recycled to the so-called exemplary "CIX" extraction process of the invention.

A number of embodiments of the invention have been described. Nevertheless, it will be understood that various modifications may be made without departing from the spirit and scope of the invention. Accordingly, other embodiments are within the scope of the following claims.

What is claimed is:

1. A method or process for the removal of one or more cationic metal minor element (ME) components, a mixture of minor element components, and/or a cationic metal impurity or contaminant, from a wet-process phosphoric acid comprising use of a continuous ion exchange system, comprising:
   (a) providing a wet-process phosphoric acid comprising a pretreated phosphoric acid solution, or a pretreated solution comprising a phosphoric acid, or a pretreated phos-acid feedstock, comprising high levels of one or more minor cationic element (ME) components, or a mixture of minor cationic element components,
   and the pretreatment comprises reducing the amount of suspended solids content in an untreated wet-process phosphoric acid solution;
   (b) providing a continuous ion exchange system comprising a strong cationic exchange resin or equivalent material, wherein the strong cationic resin or equivalent material is in the H+ form
   (c) providing a strong acid regeneration solution comprising a strong acid;
   (d) applying the solution comprising a phosphoric acid or the phosphoric acid solution or the phos-acid feedstock of (a) to the strong cation exchange resin or equivalent material under conditions such that substantially most of the cationic metal impurities, contaminants, or minor element (ME) components, remain on the cationic exchange resin,
   and an effluent acid solution is produced that has substantially lowered amounts of cationic metal impurities, contaminants, or minor element (ME) components, and substantially most of the cationic metal impurities, contaminants, or minor element (ME) components remain bound to the strong cation exchange resin or equivalent material; and
   (e) removing the cationic metal impurities, contaminants, or minor element (ME) components, or eluting the cationic metal impurities, contaminants, or minor element (ME) components, from the strong cationic exchange resin or equivalent material using the strong acid regeneration solution to produce a cationic metal impurity-, contaminant-and/or minor element-containing effluent acid solution comprising substantially most of the cationic metal impurities, contaminants, or minor element (ME) components as an eluate,
   further comprising treating the cationic metal impurity-, contaminant-and/or minor element-containing effluent acid solution with a ground phosphate rock or equivalent, to generate:
   an acid solution comprising a water soluble phosphate, wherein the phosphate is derived from the ground phosphate rock or equivalent, and
   a slow release phosphate material from the excess ground phosphate rock in a slurry form comprising the metallic impurities with the phosphate material.

2. The method or process of claim 1, wherein the treated ground phosphate rock or equivalent is used to produce a phosphate fertilizer product.

3. A method or process for the removal of one or more cationic metal minor element (ME) components, a mixture of minor element components, and/or a cationic metal impurity or contaminant, from a wet-process phosphoric acid comprising use of a continuous ion exchange system, comprising:
   (a) providing a wet-process phosphoric acid comprising a pretreated phosphoric acid solution, or a pretreated solution comprising a phosphoric acid, or a pretreated phos-acid feedstock, comprising high levels of one or more minor cationic element (ME) components, or a mixture of minor cationic element components,
   and the pretreatment comprises reducing the amount of suspended solids content in an untreated wet-process phosphoric acid solution;
   (b) providing a continuous ion exchange system comprising a strong cationic exchange resin or equivalent material, wherein the strong cationic resin or equivalent material is in the H+ form
   (c) providing a strong acid regeneration solution comprising a strong acid;
   (d) applying the solution comprising a phosphoric acid or the phosphoric acid solution or the phos-acid feedstock of (a) to the strong cation exchange resin or equivalent material under conditions such that substantially most of the cationic metal impurities, contaminants, or minor element (ME) components, remain on the cationic exchange resin,
   and an effluent acid solution is produced that has substantially lowered amounts of cationic metal impurities, contaminants, or minor element (ME) components, and substantially most of the cationic metal impurities, contaminants, or minor element (ME) components remain bound to the strong cation exchange resin or equivalent material; and
   (e) removing the cationic metal impurities, contaminants, or minor element (ME) components, or eluting the cationic metal impurities, contaminants, or minor element (ME) components, from the strong cationic exchange resin or equivalent material using the strong acid regeneration solution to produce a cationic metal impurity-, contaminant-and/or minor element-containing effluent acid solution comprising substantially most of the cationic metal impurities, contaminants, or minor element (ME) components as an eluate,
   further comprising evaporating the strong acid regeneration solution to selectively crystallize the cationic metal minor element fractions, wherein the crystallizing results in or produces an ME-sulfate salt.

4. A method or process for the removal of one or more cationic metal minor element (ME) components, a mixture of minor element components, and/or a cationic metal impurity or contaminant, from a wet-process phosphoric acid comprising use of a continuous ion exchange system, comprising:
(a) providing a wet-process phosphoric acid comprising a pretreated phosphoric acid solution, or a pretreated solution comprising a phosphoric acid, or a pretreated phos-acid feedstock, comprising high levels of one or more minor cationic element (ME) components, or a mixture of minor cationic element components,
and the pretreatment comprises reducing the amount of suspended solids content in an untreated wet-process phosphoric acid solution, optionally by filtering;
(b) providing a continuous ion exchange system comprising a strong cationic exchange resin or equivalent material, wherein the strong cationic resin or equivalent material is in the H+form;
(c) providing a strong acid regeneration solution comprising a strong acid;
(d) applying the solution comprising a phosphoric acid or the phosphoric acid solution or the phos-acid feedstock of (a) to the strong cation exchange resin or equivalent material under conditions such that substantially most of the cationic metal impurities, contaminants, or minor element (ME) components, remain on the cationic exchange resin or equivalent material,
and an effluent acid solution is produced that has substantially lowered amounts of cationic metal impurities, contaminants, or minor element (ME) components, and substantially most of the cationic metal impurities, contaminants, or minor element (ME) components remain bound to the strong cationic exchange resin or equivalent material,
and optionally the produced acid solution is suitable for the production of fertilizer materials or di-ammonium phosphate (DAP), which requires a phosphoric acid that has a limited amount of cationic impurities; and
(e) removing the cationic metal impurities, contaminants, or minor element (ME) components, or eluting the cationic metal impurities, contaminants, or minor element (ME) components, from the strong cationic exchange resin or equivalent material using the strong acid regeneration solution to produce a cationic metal impurity-, contaminant-and/or minor element-containing effluent acid solution comprising substantially most of the cationic metal impurities, contaminants, or minor element (ME) components as an eluate,
wherein the strong cationic resin or equivalent material is either:
(a) designed as a continuous ion exchange system operated by restricting the flow of the strong acid regeneration solution in order to preferentially load one of the minor element materials on the resin, or
(b) in the strong acid regeneration solution.

5. The method or process of claim 1, wherein the strong cationic resin or equivalent material is designed as a continuous ion exchange system having one or more zones, and the continuous ion exchange system is operated in an up-flow mode to allow for periodic resin bed expansion and flushing of any accumulated solids from the resin.

6. The method or process of claim 3, wherein the concentration of the strong acid in the strong acid regeneration solution is increased,
wherein optionally the strong acid in the strong acid regeneration solution is increased to concentrations in excess of about 40% for the sulfuric acid $H_2SO_4$; optionally in excess of about 50% for the nitric acid or in excess of about 30% for the hydrochloric acid.

7. The method or process of claim 3, wherein:
(a) the strong acid regeneration solution comprises a sulfuric acid ($H_2SO_4$), a nitric acid ($HNO_3$) or a hydrochloric acid (HCl),
(b) the method of (a), wherein the sulfuric acid has a strength from about 5% to up to 98%, or in the range of about 20% to about 40%;
(c) the strong acid regeneration solution comprises an acid having a strength from about 5% up to a concentrated level; or
(d) the strong acid regeneration solution comprises a strength up to about 35%, 40%, 50%, 60%, 70%, 80%, 90% or 98%, optionally in the range of about 62% when the strong acid regeneration solution comprises a nitric acid and about 37% when the strong acid regeneration solution comprises a hydrochloric acid.

8. The method or process of claim 3, wherein:
(a) the phosphoric acid strength can range from about 12% to about 30% $P_2O_5$;
(b) the phosphoric acid strength can range from about 18% to about 25%;
(c) the phosphoric acid strength can range from about 42% $P_2O_5$ up to about 54% $P_2O_5$;
(d) the phosphoric acid strength can range from about 12% $P_2O_5$ to about 18% $P_2O_5$; or
(e) the phosphoric acid strength can range from about 25% $P_2O_5$ to about 30% $P_2O_5$.

9. The method or process of claim 3, wherein the strong cationic exchange resin or equivalent material capable of binding the minor element (ME) components are selected from the group consisting of:
(a) a Purolite SST-60™ material, comprised of gel polystyrene crosslinked with divinylbenzene (DVB) and a sulfonic acid functional group (Purolite, Bala Cynwyd, PA), or equivalents;
(b) a Purolite C-100™ resin, comprised of gel polystyrene crosslinked with divinylbenzene (DVB) and a sulfonic acid functional group (Purolite, Bala Cynwyd, PA), or equivalents;
(c) a Dowex MSC 650™ material (Dow Chemical, Midland, MI), or equivalents;
(d) a resin, a composition or a material, or a non-resin solid or a semi-solid material, comprising chelating groups, functionalities or moieties that can bind ME components,
wherein optionally that comprise a sulfonic acid functional group, iminodiacetic groups, chelating aminomethyl phosphonic acid groups or aminophosphinic groups, or similar chelating functionalities or moieties,
and optionally the compositions comprise beads, wires, meshes, nanobeads, nanotubes, nanowires or other nano-structures, or hydrogels; and
(e) any combination thereof.

10. The method or process of claim 3, wherein a cationic calcium ($Ca^{+2}$) is also removed from the acid phase onto the resin.

11. The method or process of claim 3, wherein the phosphoric acid solution, the solution comprising a phosphoric acid, or the phos-acid feedstock, is first treated, or pre-treated, with a clarification process or a filtering process, or a clarification aid,
and optionally the clarification process, filtering process or clarification aid comprises an activated clay, an activated carbon, an activated silica, or equivalents, or any combination thereof.

12. The method or process of claim 3, further comprising subsequently recovering the ME-sulfate salt, optionally as a marketable secondary/minor element fertilizer material.

13. The method or process of claim 3, further comprising recycling the concentrated sulfuric acid ($H_2SO_4$) fraction to a primary extraction system.

14. The method or process of claim 3, wherein the method or process operates at a temperature:
(a) in excess of about 140° F., but less than about 190° F., or
(b) between about 145° F. and about 160° F.,
thereby resulting in a heated strong acid regeneration solution and a heated impurity-, contaminant- and/or minor element-containing effluent acid solution.

15. The method or process of claim 14, further comprising cooling the heated impurity-, contaminant- and/or minor element-containing effluent acid solution, wherein upon cooling sulfates crystallize from the solution as a mixed impurity-, contaminant- and/or minor element-sulfate product, thus producing a impurity-, contaminant- and/or minor element-free concentrated acid, or sulfuric acid ($H_2SO_4$) and sulfate crystals.

16. The method or process of claim 1, wherein the cationic metal minor element components, or impurities or contaminants, comprise a cationic iron, optionally as a $Fe^{+2}$ or $Fe^{+3}$, or a cationic aluminum, optionally in the $Al^{+3}$ form, or a cationic magnesium, optionally as $Mg^{+2}$.

17. The method or process of claim 1, wherein the phosphoric acid solution, the solution comprising a phosphoric acid, or the phos-acid feedstock, is first treated, or pre-treated, with a clarification process or a filtering process, or a clarification aid.

18. The method or process of claim 1, further comprising:
(a) treating the cationic metal impurity-, contaminant- and/or minor element-containing effluent acid solution with a lime and/or a lime-limestone mixture to precipitate the eluted minor elements as a hydroxide material; or,
(b) neutralizing the cationic metal impurity-, contaminant- and/or minor element-containing effluent acid solution to precipitate the eluted cationic metal impurity, contaminant, or minor elements as a hydroxide material,
and optionally further comprising separating the precipitated material for disposal to generate a precipitate-free water phase, optionally further comprising recycling the precipitate-free water phase.

19. The method or process of claim 3, wherein the cationic metal minor element components, or impurities or contaminants, comprise a cationic iron, optionally as a $Fe^{+2}$ or $Fe^{+3}$, or a cationic aluminum, optionally in the $Al^{+3}$ form, or a cationic magnesium, optionally as $Mg^{+2}$.

20. The method or process of claim 3, wherein the phosphoric acid solution, the solution comprising a phosphoric acid, or the phos-acid feedstock, is first treated, or pre-treated, with a clarification process or a filtering process, or a clarification aid.

21. The method or process of claim 3, further comprising:
(a) treating the cationic metal impurity-, contaminant- and/or minor element-containing effluent acid solution with a lime and/or a lime-limestone mixture to precipitate the eluted minor elements as a hydroxide material; or,
(b) neutralizing the cationic metal impurity-, contaminant- and/or minor element-containing effluent acid solution to precipitate the eluted cationic metal impurity, contaminant, or minor elements as a hydroxide material,
and optionally further comprising separating the precipitated material for disposal to generate a precipitate-free water phase, optionally further comprising recycling the precipitate-free water phase.

22. The method or process of claim 21, further comprising:
separating the precipitated material for disposal to generate a precipitate-free water phase, and optionally further comprising recycling the precipitate-free water phase.

23. The method or process of claim 1, wherein the pretreatment to reduce the amount of suspended solids content in an untreated wet-process phosphoric acid solution comprises filtering.

24. The method or process of claim 1, wherein the produced acid solution in step (d) is suitable for the production of fertilizer materials or di-ammonium phosphate (DAP), which requires a phosphoric acid that has a limited amount of cationic impurities.

25. The method or process of claim 1, wherein the treated ground phosphate rock or equivalent is used to produce a phosphate fertilizer product, optionally comprising a fast release $P_2O_5$; a slow release $P_2O_5$; secondary nutrients; and/or minor element nutrients.

26. The method or process of claim 1, further comprising recycling of the substantially cationic metal impurity-, contaminant- and/or minor element-free acid solution for use as a phosphoric acid solution, or a solution comprising a phosphoric acid, or a phos-acid feedstock of step 1(a).

27. The method or process of claim 3, wherein the pretreatment to reduce the amount of suspended solids content in an untreated wet-process phosphoric acid solution comprises filtering.

28. The method or process of claim 3, wherein in step (d) the produced acid solution is suitable for the production of fertilizer materials or di-ammonium phosphate (DAP), which requires a phosphoric acid that has a limited amount of cationic impurities.

* * * * *